(12) United States Patent
Bian (10) Patent No.: US 11,287,719 B2
(45) Date of Patent: Mar. 29, 2022

(54) TUNABLE GRATING COUPLERS CONTAINING A MATERIAL WITH A VARIABLE REFRACTIVE INDEX

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 16/922,233

(22) Filed: Jul. 7, 2020

(65) Prior Publication Data
US 2022/0011640 A1    Jan. 13, 2022

(51) Int. Cl.
G02B 6/26    (2006.01)
G02F 1/225    (2006.01)
G02B 6/34    (2006.01)

(52) U.S. Cl.
CPC .............. G02F 1/225 (2013.01); G02B 6/34 (2013.01); *G02F 2201/302* (2013.01)

(58) Field of Classification Search
CPC ...... G02F 1/225; G02F 2201/302; G02B 6/34
See application file for complete search history.

(56) References Cited

U.S. PATENT DOCUMENTS

| | | | |
|---|---|---|---|
| 4,006,963 A | 2/1977 | Baues et al. | |
| 5,357,591 A * | 10/1994 | Jiang | G02B 6/29325 359/566 |
| 5,579,143 A | 11/1996 | Huber | |
| 6,356,674 B1 | 3/2002 | Davis et al. | |
| 6,821,457 B1 | 11/2004 | Natarajan et al. | |
| 8,615,025 B2 * | 12/2013 | Dallesasse | H01S 5/021 372/20 |
| 9,519,163 B2 * | 12/2016 | Zheng | G02B 6/24 |
| 10,509,244 B1 * | 12/2019 | Shank | G02F 1/0147 |
| 10,642,125 B1 | 5/2020 | Ellis-Monaghan et al. | |
| 2017/0297750 A1 * | 10/2017 | Liu | B64G 1/503 |
| 2020/0166709 A1 | 5/2020 | Bian et al. | |

OTHER PUBLICATIONS

Alok P. Vasudev, Ju-Hyung Kang, Junghyun Park, Xiaoge Liu, and Mark L. Brongersma, "Electro-optical modulation of a silicon waveguide with an "epsilon-near-zero" material," Opt. Express 21, 26387-26397 (2013).
J. Kim et al., "Tunable Grating Couplers for Broadband Operation Using Thermo-Optic Effect in Silicon," in IEEE Photonics Technology Letters, vol. 27, No. 21, pp. 2304-2307, 1 Nov. 1, 2015, doi: 10.1109/LPT.2015.2462081.

(Continued)

*Primary Examiner* — Ellen E Kim
(74) *Attorney, Agent, or Firm* — Thompson Hine LLP; Francois Pagette (57) ABSTRACT

Structures including a grating coupler and methods of forming a structure that includes a grating coupler. The grating coupler includes segments that are positioned with a spaced relationship on a slab layer. The segments contain an active material configured to have a first state with a first refractive index and a second state with a second refractive index in response to an applied stimulus. The first and second states may be produced by applying different sets of bias voltages to the segments as the applied stimulus.

20 Claims, 7 Drawing Sheets

(56) References Cited

OTHER PUBLICATIONS

M. Rakowski, C. Meagher, K. Nummy, A. Aboketat, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
Yusheng Bian et al., "Tunable Grating Couplers", filed Jul. 19, 2019 as U.S. Appl. No. 16/516,658.

\* cited by examiner

TUNABLE GRATING COUPLERS CONTAINING A MATERIAL WITH A VARIABLE REFRACTIVE INDEX

BACKGROUND

The present invention relates to photonics chips and, more particularly, to structures including a grating coupler and methods of forming a structure that includes a grating coupler.

Photonics chips are used in many applications and systems such as data communication systems and data computation systems. A photonics chip integrates optical components, such as waveguides, optical switches, grating couplers, and polarizers, and electronic components, such as field-effect transistors, into a unified platform. Among other factors, layout area, cost, and operational overhead may be reduced by the integration of both types of components in the photonics chip.

Grating couplers are commonly used in photonics chips to provide antennas in Light Detection and Ranging (LIDAR) systems, as well as to provide antennas in silicon photonics phased arrays. Grating couplers are planar structures that can direct laser pulses off-chip at a given emission angle or receive laser pulses. Conventional grating couplers are passive optical components having an optical performance that cannot be tuned, switched, or otherwise configured or reconfigured.

Improved structures including a grating coupler and methods of forming a structure that includes a grating coupler are needed.

SUMMARY

In an embodiment of the invention, a structure includes a slab layer and a grating coupler including a plurality of segments positioned with a spaced relationship on the slab layer. The plurality of segments are comprised of an active material configured to have a first state with a first refractive index and a second state with a second refractive index in response to an applied stimulus.

In an embodiment of the invention, a method includes forming a slab layer, and forming a grating coupler including a plurality of segments positioned with a spaced relationship on the slab layer. The plurality of segments are comprised of an active material configured to have a first state with a first refractive index and a second state with a second refractive index in response to an applied stimulus.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
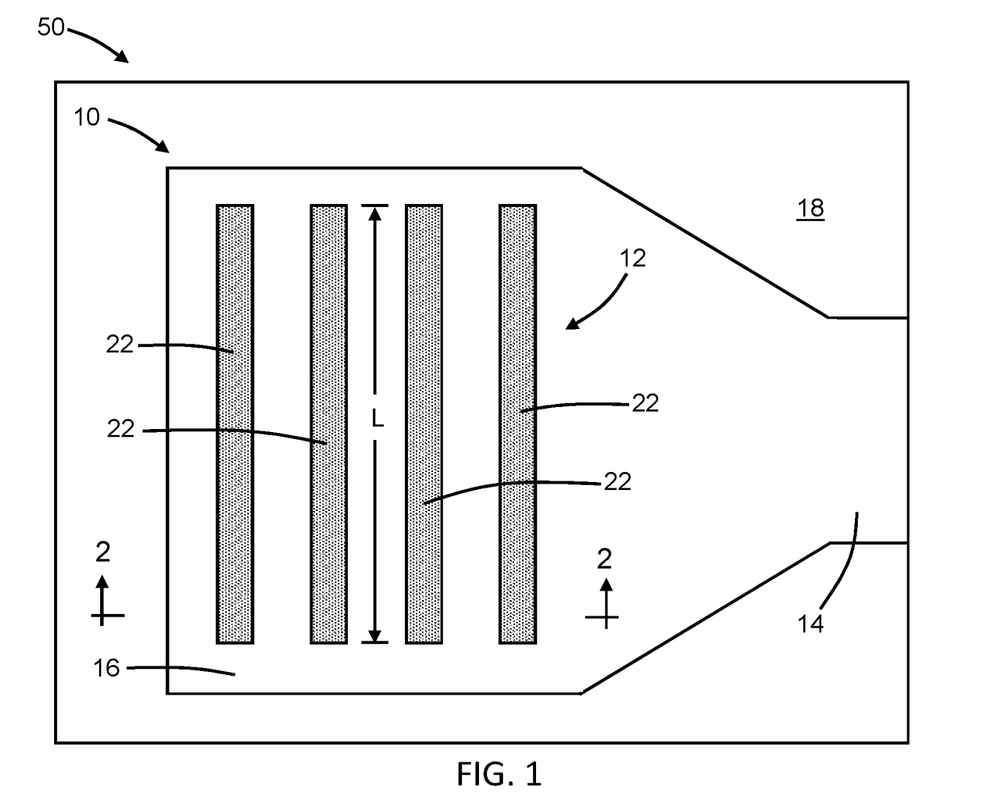
FIG. 1 is a top view of a photonics chip including a structure at an initial fabrication stage of a processing method in accordance with embodiments of the invention.
Figure 2:
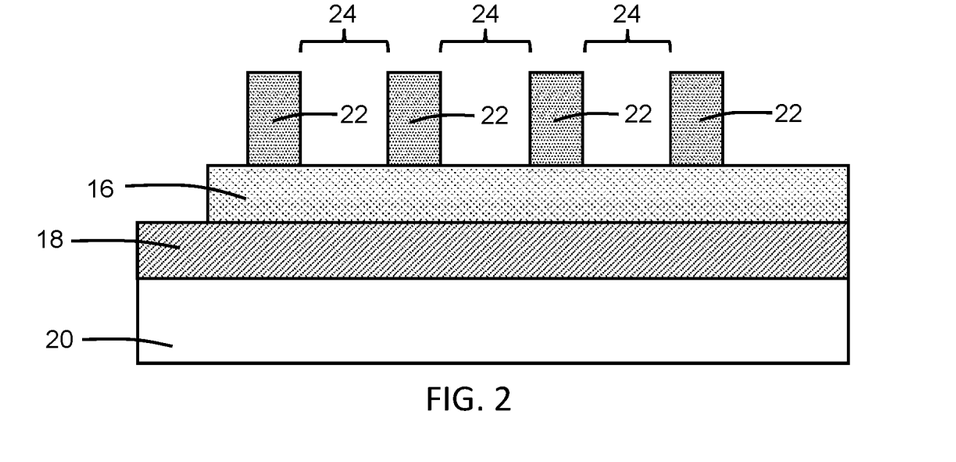
FIG. 2 is a cross-sectional view of the structure taken generally along line 2-2 in FIG. 1.

With reference to FIGS. 1, 2 and in accordance with embodiments of the invention, a structure 10 includes a grating coupler 12 that is coupled to a waveguide core 14. The grating coupler 12 is positioned on a slab layer 16. In the representative embodiment, the slab layer 16 is an integral portion of the waveguide core 14 and may be comprised of the same material as the waveguide core 14. In an embodiment, the waveguide core 14 may be comprised of a single-crystal semiconductor material, such as single-crystal silicon. In an embodiment, the single-crystal semiconductor material may originate from a device layer of a silicon-on-insulator substrate that further includes a buried oxide layer 18 and a substrate 20 comprised of a single-crystal semiconductor material, such as single-crystal silicon. The waveguide core 14 may be patterned from the device layer of the silicon-on-insulator substrate by lithography and etching processes during front-end-of-line processing of the photonics chip 50. In the representative embodiment, the slab layer 16 of the waveguide core 14 is a rectangular pad that is joined by a taper with a narrower portion of the waveguide core 14.

The grating coupler 12 may include grating structures or segments 22 that are laterally spaced on the slab layer 16 of the waveguide core 14 with a given pitch. In the representative embodiment, the segments 22 are rectangular ridges or strips with a length dimension, L, that is greater than the width dimension, and that have a parallel arrangement along their respective length dimensions. In an embodiment, the segments 22 may be in direct contact with the slab layer 16 of the waveguide core 14 and project away from the top surface of the slab layer 16. The segments 22 may have vertical sidewalls, as shown, or sidewalls with some degree of tapering and/or curvature. The narrower portion of the waveguide core 14 is configured to guide laser light to or from the grating coupler 12.

The segments 22 of the grating coupler 12 have an alternating arrangement with grooves 24 that separate adjacent pairs of segments 22. The grooves 24 extend to the slab layer 16 of the waveguide core 14 such that strips of the slab layer 16 are exposed between adjacent segments 22. In an embodiment, the segments 22 may have a uniform width and/or a uniform spacing between adjacent segments 22 to define a periodic arrangement. In an alternative embodiment, the segments 22 may have a non-uniform width and/or a non-uniform spacing between adjacent segments 22. In an alternative embodiment, the segments 22 may be curved ridges instead of linear ridges as in the representative embodiment.

The segments 22 may contain an active material characterized by a variable index of refraction (i.e., refractive index) that can be varied as a function of an applied bias voltage to transition between discrete states characterized by different refractive indices. For example, dependent upon the applied bias voltage, the active material of each segment 22 may have a state characterized by a high refractive index and a state characterized by a low refractive index that is less than the high refractive index. For example, the real part of the refractive index of the active material may be higher when the bias voltage is present than when the bias voltage is absent to provide a two-state system characterized by a high refractive index state and a low refractive index state. In alternative embodiments, the state-to-state transition can be produced by applying and removing a different type of applied stimulus than electrical biasing, such as heating or optical absorption by optical pumping.

The segments 22 may be formed from a layer deposited by atomic layer deposition or chemical vapor deposition and patterned with lithography and etching processes. In an embodiment, the segments 22 may be comprised of a conducting oxide, such as indium-tin oxide (ITO). In an embodiment, the segments 22 may be comprised of a phase change material, such as vanadium oxide or germanium-antimony telluride. In an embodiment, the segments 22 may be comprised of a two-dimensional material, such as graphene or molybdenum disulphide. In an alternative embodiment, the segments 22 may be comprised of an organic material, such as a polymer.

Figure 3:
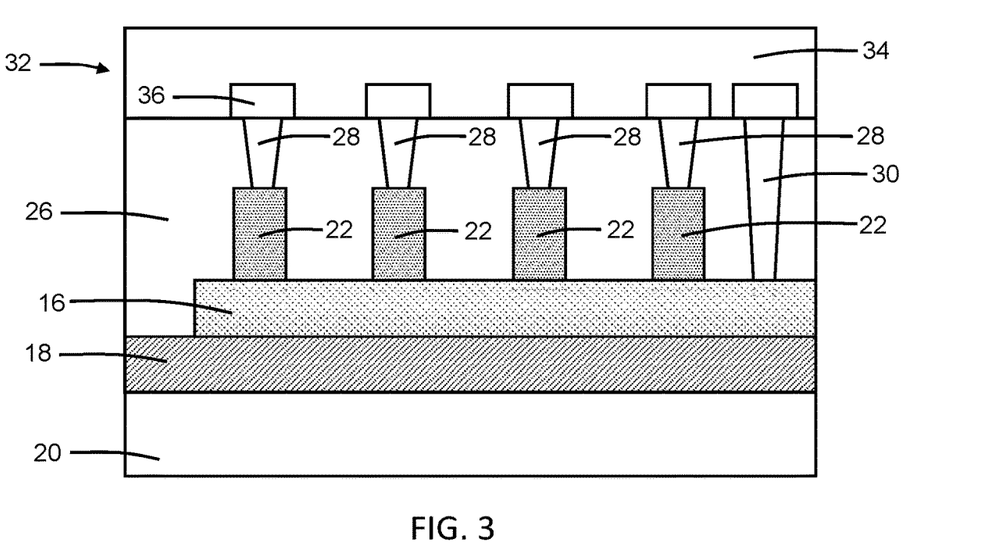
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 26 is formed over the grating coupler 12 and the waveguide core 14. The dielectric layer 26 may be comprised of a dielectric material, such as silicon dioxide, deposited by chemical vapor deposition and planarized with, for example, chemical-mechanical polishing to remove topography. The segments 22 are embedded or buried in the dielectric material of the dielectric layer 26 such that the grooves 24 are filled by the dielectric material of the dielectric layer 26.

Contacts 28, 30 are formed in the dielectric layer 26 by middle-of-line (MOL) processing. One of the contacts 28 is coupled with each of the segments 22 and, in an embodiment, the contacts 28 may be directly connected with the segments 22. The contact 30 is coupled with the slab layer 16 and, in an embodiment, the contact 30 may be directly connected with the slab layer 16. In an embodiment, the contacts 28 may be arranged proximate to one or the other of the ends of the segments 22, or at both ends of the segments 22, to avoid obstructing the grating coupler 12 during use.

A back-end-of-line stack 32 may be formed by back-end-of-line (BEOL) processing over the dielectric layer 26. The back-end-of-line stack 32 may include one or more dielectric layers 34 composed of a dielectric material, such as silicon dioxide or a low-k dielectric material, and metal features 36 composed of a metal, such as copper or aluminum, that are arranged in the one or more dielectric layers 34.

The segments 22 can be individually placed in different states in which the variable refractive index of its active material is tunable (i.e., switchable) to provide transitions between the different states. The state-to-state transition can be produced by applying and removing an applied stimulus, such as an applied bias voltage. In that regard, the bias voltage may be supplied from a power supply through the contacts 28, 30 and metal features 36 to selectively tune the refractive index of each segment 22 between the different refractive index states. In an embodiment, the active material of each segment 22 may have a low refractive index in the absence of an applied bias voltage, and the active material of each segment 22 may have a high refractive index in the presence of an applied bias voltage.

The structure 10, in any of its embodiments described herein, may be integrated into a photonics chip 50 (FIG. 1) that includes electronic components and additional optical components. For example, the electronic components may include field-effect transistors that are fabricated by CMOS front-end-of-line (FEOL) processing.

The grating coupler 12 can be configurable between different light-coupling conditions based on combinations of the different refractive index states of each tunable segment 22, which provides an additional degree of freedom for modulating the laser light emitted from the grating coupler 12 or received by the grating coupler 12. For example, the grating coupler 12 may be configured to be switched between an "ON" light-coupling condition in which the grating coupler 12 has a high coupling efficiency for laser light at a particular wavelength and an "OFF" light-coupling condition in which the grating coupler 12 has a low coupling efficiency at the particular wavelength. The switching may be produced by applying a bias voltage to all segments 22 to provide the high coupling efficiency for the "ON" light-coupling condition, and removing the bias voltage from all segments 22 to provide the low coupling efficiency for the "OFF" light-coupling condition. As another example, the grating coupler 12 may be configured to shift the spectrum and peak wavelength such that the wavelength range for operation of the grating coupler 12 is expanded. The shift may be produced, for example, by applying a bias voltage to all segments 22 to emit or receive laser light at a given peak wavelength to provide a light-coupling condition and, subsequently, applying the bias voltage to only alternating segments 22 to receive or emit laser light at a different peak wavelength and thereby provide a different light-coupling condition.

Figure 3A:
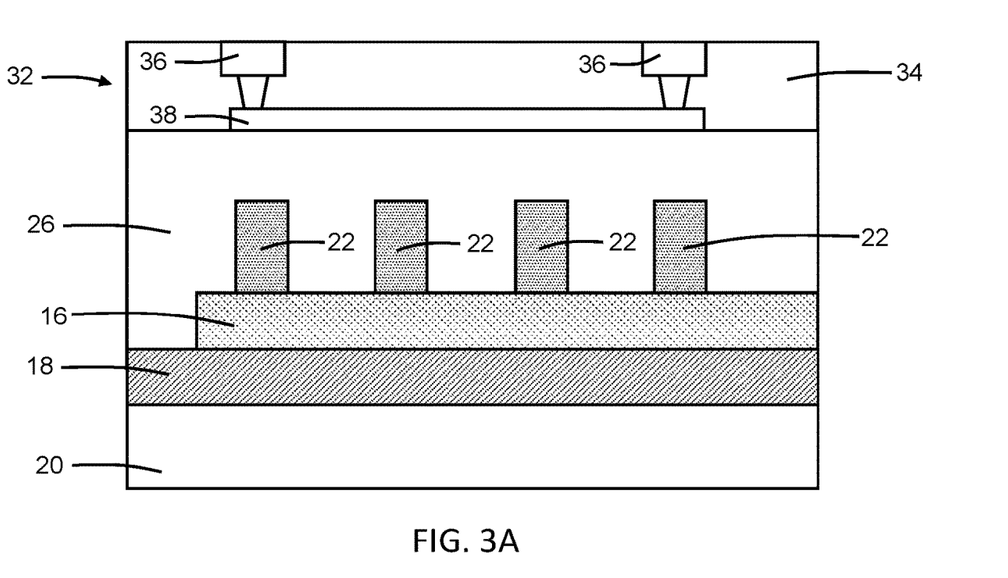
FIG. 3A is a cross-sectional view of a structure in accordance with alternative embodiments of the invention.

With reference to FIG. 3A in which like reference numerals refer to like features in FIG. 1 and in accordance with alternative embodiments of the invention, heaters 38 may be disposed in the one or more dielectric layers 34 of the back-end-of-line stack in proximity to the segments 22. The heater 38 is coupled by metal features 36 in the back-end-of-line stack with a power supply for powering the heater 38 to provide a temperature change prompting the refractive index change of the material of the associated segment 22. The positioning of the heater 38 proximate to one end of the segments 22, similar to the contacts 28 (FIG. 3), is intended to avoid obstructing the grating coupler 12 during use. In an embodiment, another heater (not shown) similar to the heater 38 may be positioned proximate to an opposite end of the segments 22.

During operation, heat is transferred from the powered heater 38 through the back-end-of-line stack to the segments 22. The temperature of the segments 22 may be varied by the selective application of heat as the applied stimulus to provide a state with a low index of refraction below a characteristic transition temperature and a state with a high index of refraction above the transition temperature. For example, the real part of the refractive index of the active material may be higher when the temperature of the active material is above the transition temperature than when the temperature of the active material is below the transition temperature.

Figure 4:
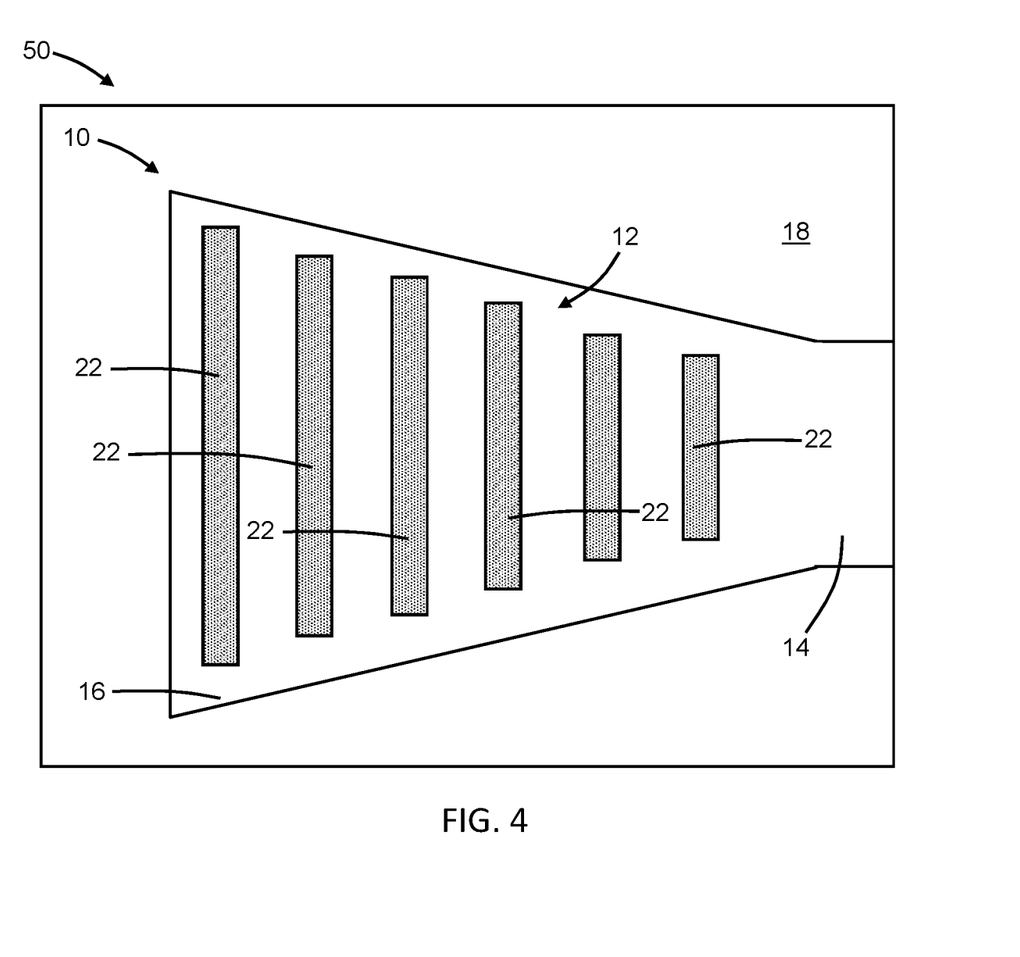
FIG. 4 is a top view of a photonics chip including a structure in accordance with alternative embodiments of the invention.

With reference to FIG. 4 in which like reference numerals refer to like features in FIG. 1 and in accordance with alternative embodiments of the invention, the slab layer 16 on which the structure 10 is located may have a different shape, which as a taper, and may be directly connected to the waveguide core 14 as an integral portion of the waveguide core 14. The segments 22 may have different lengths that are adjusted to accommodate the tapered width of the slab layer 16. For example, the lengths of the segments 22 may progressively shorten to accommodate the narrowing width of the slab layer 16. In an alternative embodiment, the segments 22 may be curved ridges or arcs with varying arc length, instead of linear ridges with varying length as in the representative embodiment.

Figure 5:
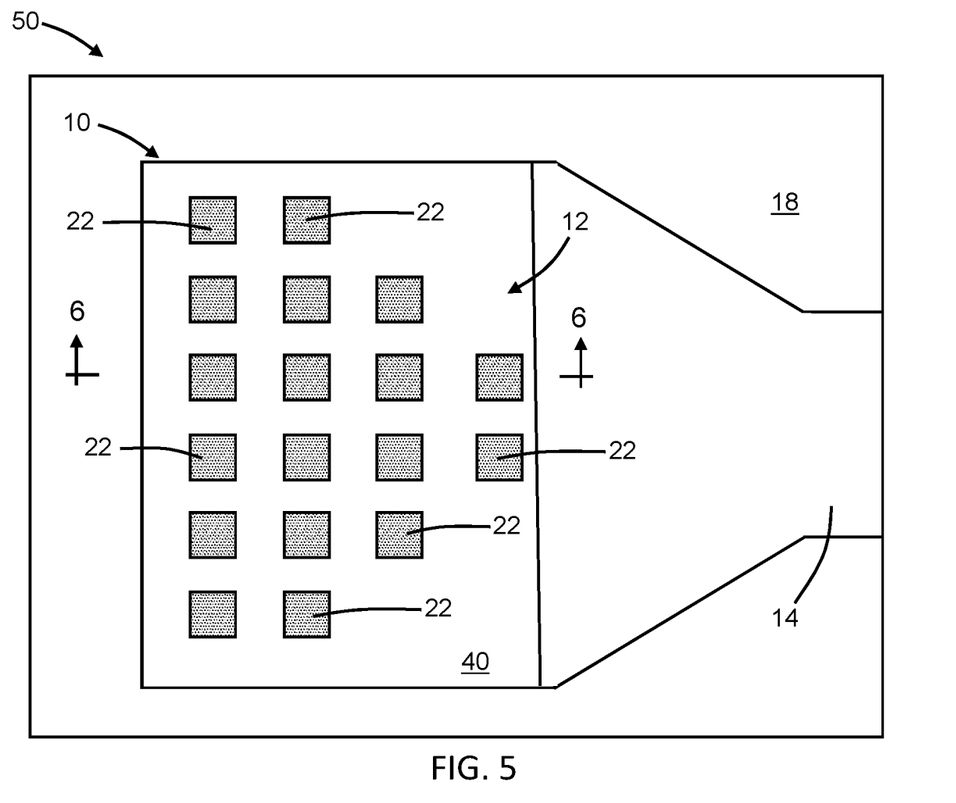
FIG. 5 is a top view of a photonics chip including a structure in accordance with alternative embodiments of the invention.
Figure 6:
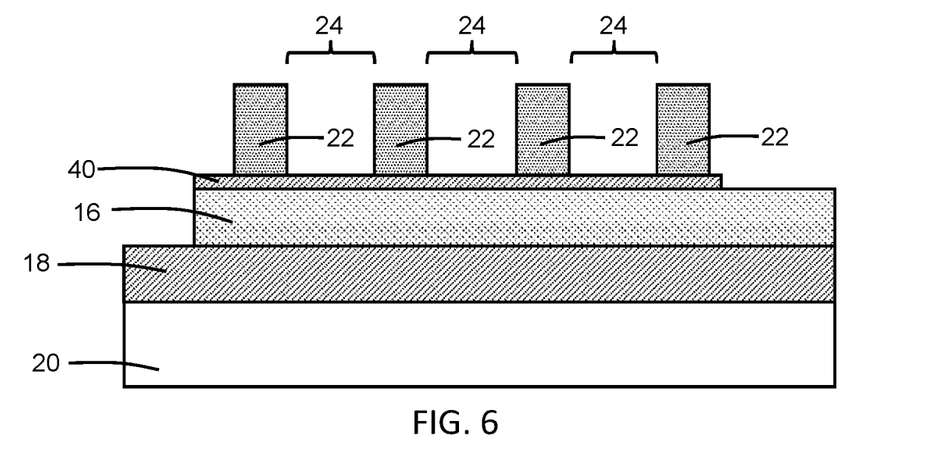
FIG. 6 is a cross-sectional view of the structure taken generally along line 6-6 in FIG. 5.

With reference to FIGS. 5, 6 in which like reference numerals refer to like features in FIGS. 1, 2 and in accordance with alternative embodiments of the invention, the segments 22 of the structure 10 may be arranged in multiple rows with the dimensions of the segments 22 adjusted to permit placement within rows on the slab layer 16. The dimensions, positions, and spacings of the segments 22 may be selected to provide a particular range of tunability. In an embodiment, the segments 22 may have uniform length, width, and thickness dimensions, and may have non-sloped sidewalls. In an alternative embodiment, the segments 22 may also be arranged in columns to define a matrix. One of the contacts 28 may be coupled with each of the segments 22. For feature sizes smaller than the wavelength of the laser light received from the waveguide core 14, the segments 22 may be considered to be a metamaterial that is characterized by properties (e.g., refractive index) that differ from bulk properties.

A dielectric layer 40 may be positioned between the segments 22 and the slab layer 16 over all or a portion of the slab layer 16. The dielectric layer 40 may function to improve light coupling by the grating coupler 12 for laser light propagating with a particular mode, such as transverse magnetic mode. The dielectric layer 40 may be shaped such that a portion of the slab layer 16 is uncovered, which permits the contact 30 (FIG. 3) to be landed on the uncovered portion of the slab layer 16 in order to provide an electrical connection that is complementary to the electrical connections to the segments 22 and provides a closed electrical circuit during use. In an alternative embodiment, the dielectric layer 40 may be omitted such that the segments 22 are in direct contact with the slab layer 16.

Figure 7:
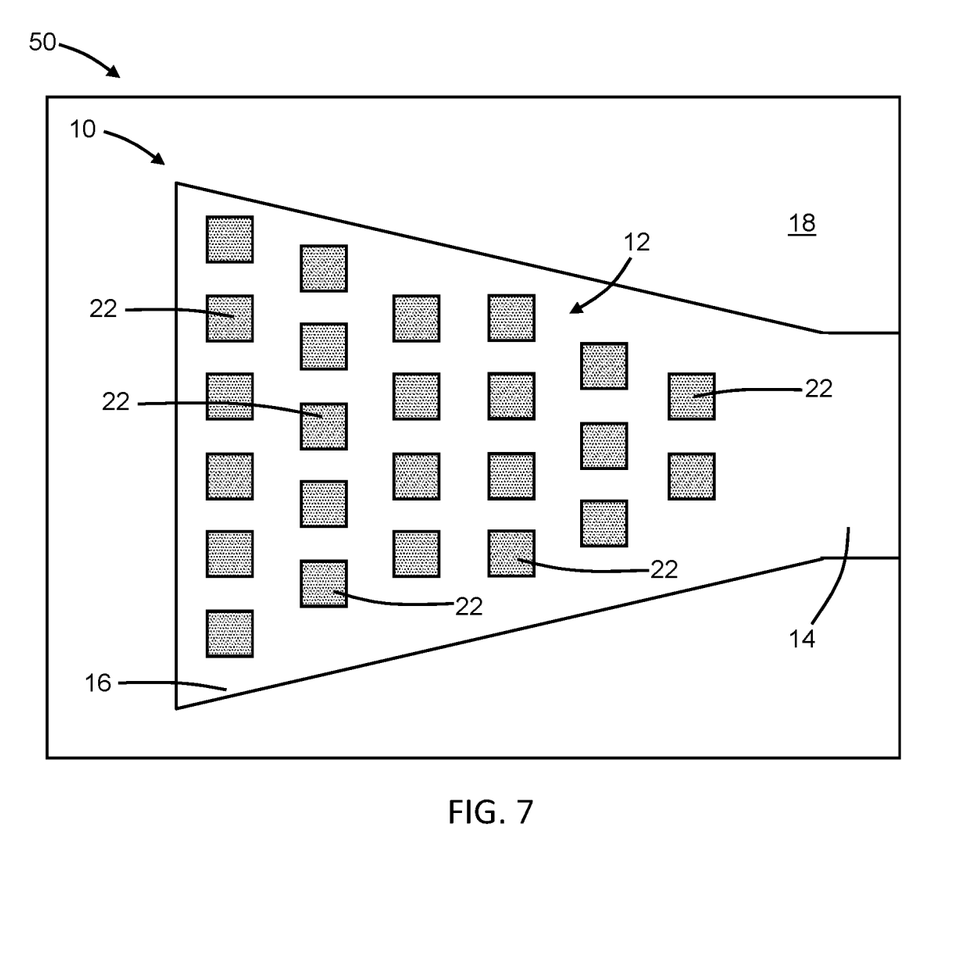
FIGS. 7-8 are top views of structures in accordance with alternative embodiments of the invention.

With reference to FIG. 7 in which like reference numerals refer to like features in FIG. 5 and in accordance with alternative embodiments of the invention, the slab layer 16 on which the structure 10 is located may have a different shape, which as a taper, and may be directly connected to the waveguide core 14 as an integral portion. The number of segments 22 in each row may be adjusted to accommodate the narrowing width of the slab layer 16. For example, the number of segments 22 in each row may be progressively reduced to accommodate the narrowing tapered width of the slab layer 16.

Figure 8:
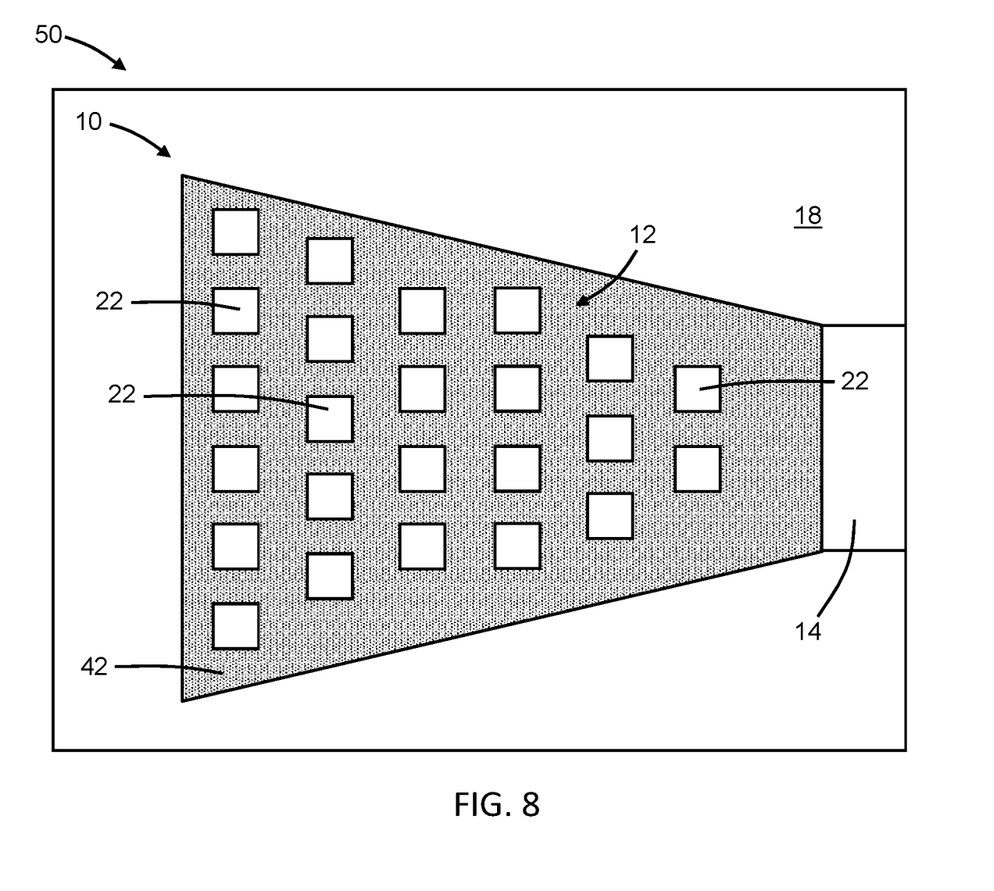

With reference to FIG. 8 in which like reference numerals refer to like features in FIG. 7 and in accordance with alternative embodiments of the invention, the segments 22 of the structure 10 may be openings in an otherwise unbroken layer 42 of the active material that is applied to the slab layer 16 and patterned by lithography and etching processes. The locations of the segments 22 may be defined during patterning by the etch mask used during lithography. The openings defining the segments 22 may extend fully through the layer 42 to the slab layer 16.

Figure 9:
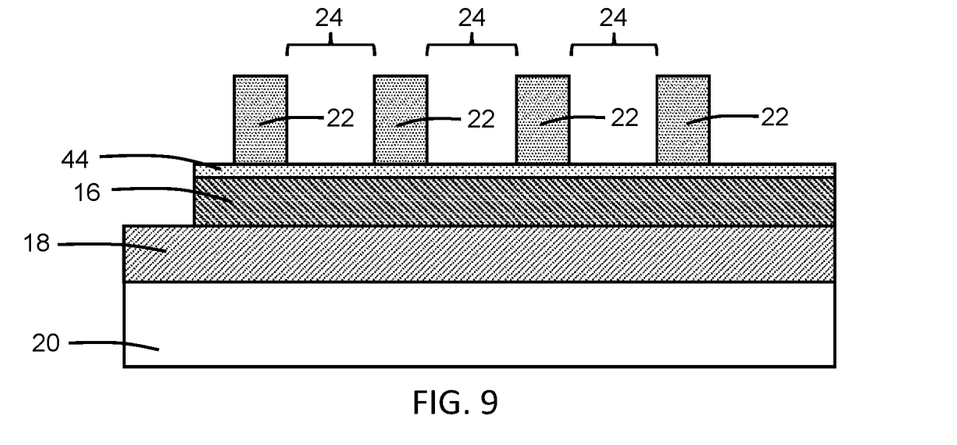
FIGS. 9-10 are cross-sectional views of structures in accordance with alternative embodiments of the invention.

With reference to FIG. 9 in which like reference numerals refer to like features in FIG. 2 and in accordance with alternative embodiments of the invention, the waveguide core 14 may be comprised of a dielectric material, such as silicon nitride, that is deposited as a layer and patterned by lithography and etching processes. The segments 22 are positioned on a layer 44 that is formed over the slab layer 16 of the waveguide core 14 before forming the grating coupler 12. The layer 44 may be comprised of a conductor, such as indium-tin oxide, tungsten, or polysilicon, and the layer 44 may be disposed between the segments 22 and the slab layer 16. The contact 30 (FIG. 3) is coupled to the layer 44 to provide an electrical connection that is complementary to the electrical connections to the segments 22.

Figure 10:
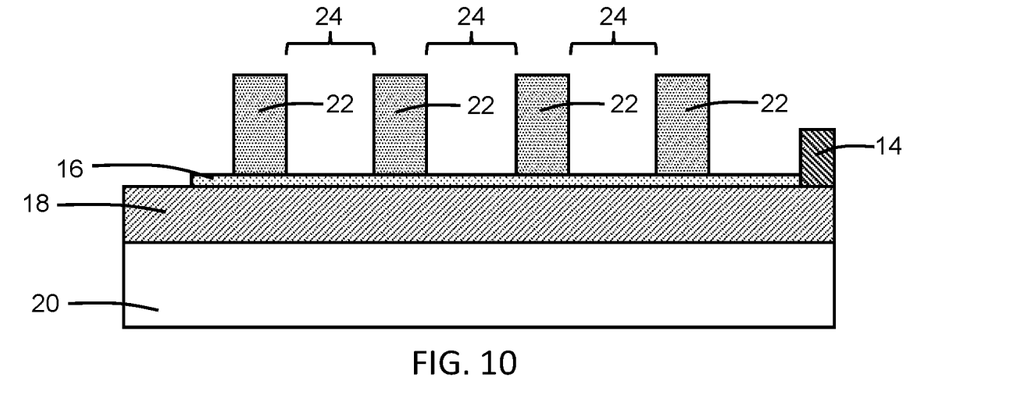

With reference to FIG. 10 in which like reference numerals refer to like features in FIG. 2 and in accordance with alternative embodiments of the invention, the slab layer 16 may be composed of a conductor, such as indium-tin oxide, tungsten, or polysilicon, that is positioned on the buried oxide layer 18 and that is structurally distinct from the waveguide core 14. In an embodiment, the slab layer 16 may be composed of a conductor, such as indium-tin oxide, tungsten, or polysilicon, that is positioned on the buried oxide layer 18. In an embodiment, the slab layer 16 may be positioned in direct contact with the buried oxide layer 18. The segments 22 are formed on the slab layer 16, and the waveguide core 14 may overlap with the slab layer 16 at one edge.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
  a slab layer;
  a grating coupler including a plurality of segments positioned with a spaced relationship on the slab layer, the plurality of segments comprised of an active material configured to have a first state with a first refractive index and a second state with a second refractive index in response to an applied stimulus;
  a first dielectric layer over the slab layer and the plurality of segments, the first dielectric layer comprising a dielectric material; and
  a plurality of first contacts in the first dielectric layer, each of the plurality of first contacts coupled to one of the plurality of segments,
  wherein the plurality of segments are embedded in the first dielectric layer such that spaces between the plurality of segments are filled by the dielectric material of the first dielectric layer.

2. The structure of claim 1 further comprising:
  a second contact in the first dielectric layer, the second contact coupled to the slab layer.

3. The structure of claim 1 wherein the active material is a conducting oxide.

4. The structure of claim 1 wherein the active material is a phase change material.

5. The structure of claim 1 wherein the active material is a two-dimensional material or a polymer.

6. The structure of claim 1 further comprising:
  a waveguide core coupled to the grating coupler,
  wherein the slab layer is integral with the waveguide core.

7. The structure of claim 1 wherein the slab layer has a tapered shape, and the plurality of segments have different lengths.

8. The structure of claim 1 further comprising:
  a waveguide core coupled to the grating coupler,
  wherein the slab layer is distinct from the waveguide core.

9. The structure of claim 8 wherein the waveguide core is comprised of a dielectric material, and the slab layer is comprised of a conductor.

10. The structure of claim 1 wherein the plurality of segments are arranged in a plurality of rows, and each of the plurality of rows contains more than one of the plurality of segments.

11. The structure of claim 10 wherein the slab layer has a tapered shape, and the plurality of rows contain different numbers of the plurality of segments.

12. The structure of claim 1 further comprising:
  a second dielectric layer positioned on the slab layer between the plurality of segments and the slab layer.

13. The structure of claim 1 further comprising:
  a conductor layer positioned on the slab layer between the plurality of segments and the slab layer.

14. The structure of claim 1 further comprising:
  a heater positioned proximate to the plurality of segments.

15. A method comprising:
  forming a slab layer; and
  forming a grating coupler including a plurality of segments positioned with a spaced relationship on the slab layer;
  forming a first dielectric layer over the slab layer and the plurality of segments; and
  forming a plurality of first contacts in the first dielectric layer,
  wherein the first dielectric layer comprises a dielectric material, each of the plurality of first contacts is coupled to one of the plurality of segments, the plurality of segments are embedded in the first dielectric layer such that spaces between the plurality of segments are filled by the dielectric material of the first dielectric layer, the plurality of segments are comprised of an active material configured to have a first state with a first refractive index and a second state with a second refractive index in response to an applied stimulus.

16. The method of claim 15 wherein forming the grating coupler including the plurality of segments positioned with the spaced relationship on the slab layer comprises:
  depositing a layer of the active material; and
  patterning the layer with lithography and etching processes.

17. The method of claim 15 wherein the active material is a conducting oxide.

18. The method of claim 15 further comprising:
  forming a second dielectric layer on the slab layer,
  wherein the second dielectric layer is positioned between the plurality of segments and the slab layer.

19. The method of claim 15 further comprising:
  forming a conductor layer on the slab layer
  wherein the conductor layer is positioned between the plurality of segments and the slab layer.

20. The method of claim 15 further comprising:
  forming a second contact in the first dielectric layer,
  wherein the second contact is coupled to the slab layer.

* * * * *